Patented Aug. 6, 1929.

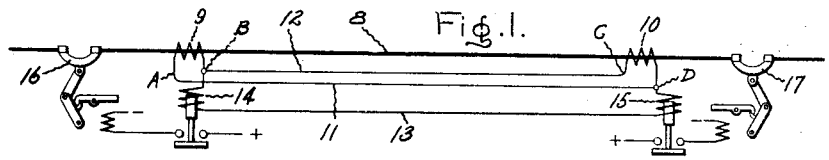
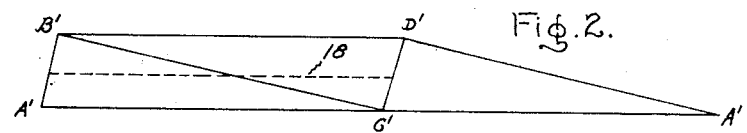
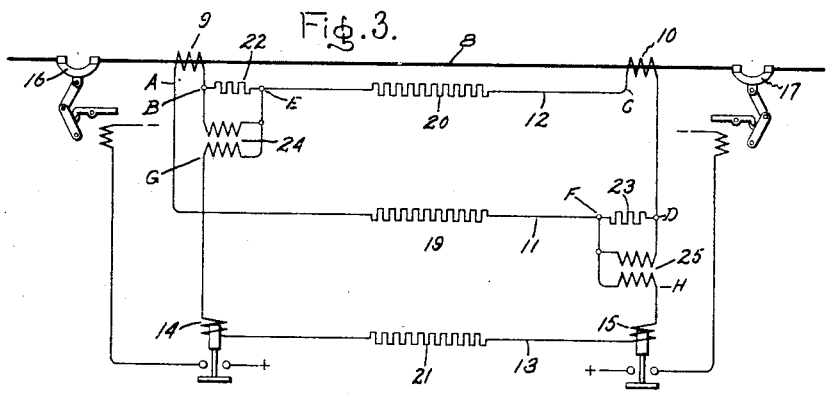
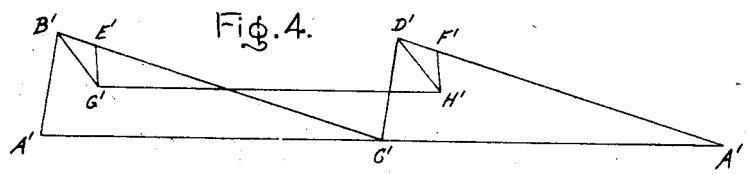
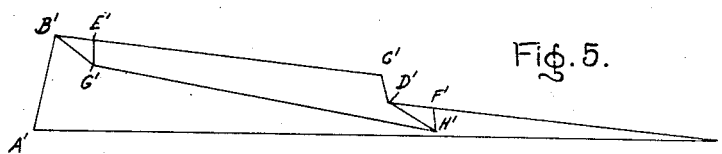
Inventor:
Sydney M. Lejeune
Herbert S. Petch
by *Alexander S. ____*
His Attorney Inventor:
Sydney M. Lejeune
Herbert S. Petch
by *Alexander S. ...*
His Attorney

1,723,870

UNITED STATES PATENT OFFICE.

SYDNEY MAURICE LEJEUNE AND HERBERT STANLEY PETCH, OF LONDON, ENGLAND, ASSIGNORS TO GENERAL ELECTRIC COMPANY, A CORPORATION OF NEW YORK.

PROTECTIVE ARRANGEMENT.

Application filed September 28, 1927, Serial No. 222,672, and in Great Britain November 1, 1926.

Our invention relates to improvements in protective arrangements for electric circuits, such as feeders, interconnectors, power transformers and the like, hereinafter designated generally by the term circuit or circuits and more particularly to protective arrangements of the kind in which pilot wires are used, for example, the differential protective arrangements known as "circulating current" or "opposed voltage."

In such protective arrangements the voltage across the pilot wires increases responsively when the current in the protected circuit increases. The increased voltage which occurs at a considerable overload produces a relatively large capacity or charging current in the pilot wires, which, as is well known, tends to affect the accurate operation of the protective arrangement and is consequently objectionable. An object of our invention is to provide an improved protective arrangement whereby this objectionable tendency is eliminated.

With a simple circulating current protective arrangement for a single phase circuit, that is an arrangement comprising current transformers at each end of the pilot wires and an auxiliary tripping or indicating circuit including the protective relays and connected between equipotential points of the pilot circuit, the charging current betwen each pilot wire and the auxiliary conductor varies from a maximum at one end to a minimum at the other, in accordance with the drop of potential along the pilot wire. Our invention, broadly speaking comprises means for maintaining the potential at the two ends of the auxiliary conductor at a value equal approximately to one half of the potential drop in one pilot wire, whereby there is no resultant charging current without preventing operation of the protective devices in response to a fault on the protected circuit. The potential applied to the ends of the auxiliary conductor may be changed to any desired predetermined value to satisfy different conditions.

Our invention will be better understood from the following description when considered in connection with the accompanying drawings and its scope will be pointed out in the appended claims.

Figure 6:
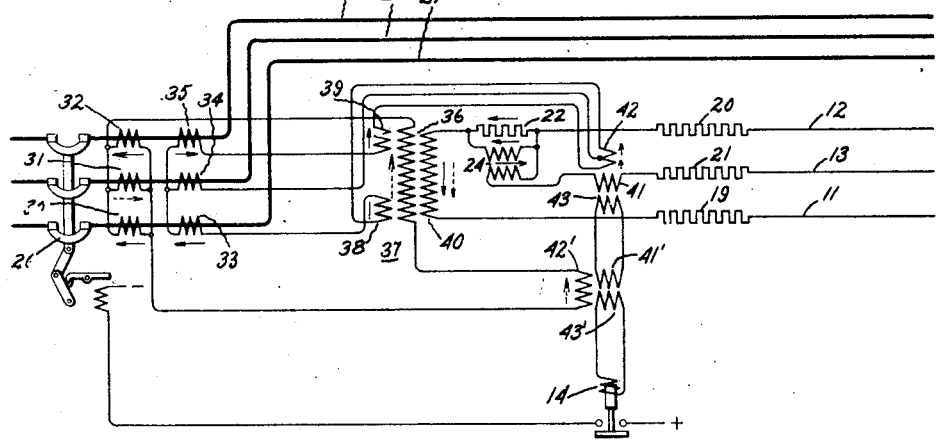
Figure 7:
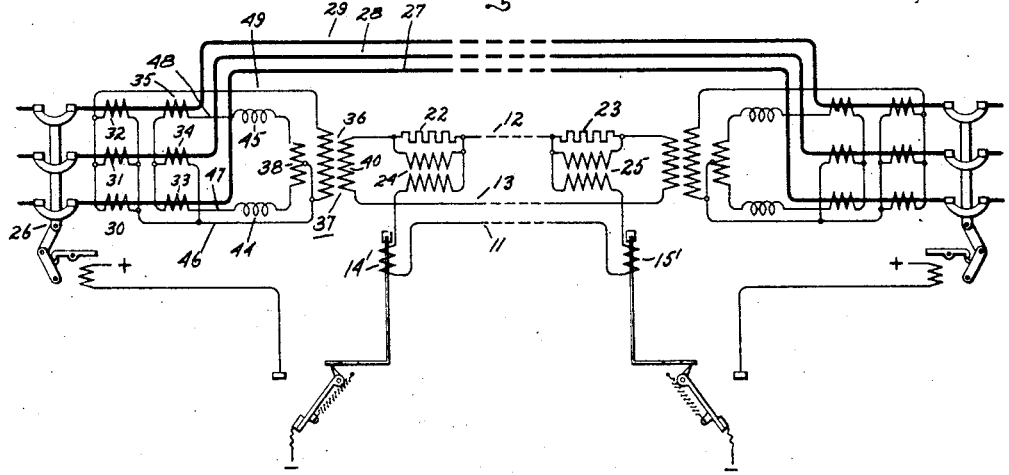

In the accompanying drawings, Fig. 1 shows a circulating current protective arrangement for a singlephase circuit; Fig. 2 is a voltage gradient diagram explanatory of Fig. 1 when the protected circuit is sound; Fig. 3 shows diagrammatically a protective arrangement embodying our invention; Fig. 4 is a voltage gradient diagram for normal conditions obtaining in Fig. 3, that is, when the protected circuit is sound; and Fig. 5 a voltage gradient diagram representing the conditions when a fault occurs on the protected circuit; Fig. 6 shows diagrammatically an arrangement embodying our invention applied to the protection of a three phase circuit, the apparatus at one end of the pilot circuit only being shown, though it will be understood that similar apparatus will be provided at each end thereof; and Fig. 7 illustrates diagrammatically a modification of our invention applied to the protection of three phase circuit.

Referring now to the drawings, and particularly to Fig. 1 first, a single phase circuit indicated diagrammatically by the single conductor 8 is provided with current transformers 9 and 10, the secondaries of which are connected for circulating current through pilot wires 11 and 12 in a well known manner. Between equipotential points B and D of the pilot circuit, there is connected an auxiliary or pilot conductor 13 including the protective relays 14 and 15 which, as is well understood in the art, may be arranged to give an indication or to effect the opening of circuit breakers 16, 17 respectively at the ends of the protected circuit when the same is faulty.

In Fig. 2, A' B' represents the voltage gradient between the points A and B of the pilot circiut, B' C' the voltage gradient between the points B and C of the pilot wire 12, C' D' the voltage gradient between the points C and D of the pilot circuit, that is, in the secondary of the current transformer 10, and D' A' the voltage gradient between the points D and A of the pilot wire 11. The voltage gradient B' D' representing the fall of potential per unit length along the auxiliary conductor 13, is horizontal in these circumstances, when there is no fault on the protected circuit 8, as the points B and D are assumed to be equipotential. It will be seen from Fig. 2, however, that there is a varying difference of potential, all along the auxiliary conductor 13, between the same and each of the pilot wires 11 and 12, the charging currents flowing into the conductor 13 being proportional to these voltages. If the potential at each end of the auxiliary conductor were changed to approximately one half the value of A' B' or C' D', so that the voltage gradient B' D' were represented by the dotted line 18, there would then be no resultant potential between the auxiliary conductor 13 and the two pilot wires 11, 12. Consequently, the conductor 13 would no longer carry charging currents. Such an ideal could, of course, be simply achieved by connecting the auxiliary conductor 13 to the mid-points of the secondary windings of the current transformers 9 and 10, instead of to the points B and D as shown in Fig. 1, but if this practice were adopted there would still be no potential difference between the ends of the auxiliary conductor 13 when a fault occurred on the protected circuit 8.

Our invention, on the other hand, provides means for changing the potential at each end of the auxiliary conductor 13 to the requisite value to prevent capacity or charging currents from passing between the said conductor and the two pilot wires, whilst at the same time allowing operation of the protective devices 14 and 15 when a fault occurs on the protected circuit 8.

An arrangement embodying our invention is shown in Fig. 3, as applied to a circulating current protective arrangement for a single phase circuit indicated diagrammatically by the conductor 8. In Fig. 3, resistors 19 and 20 represent the resistances of the pilot wires 11 and 12, respectively, and a resistor 21 represents the resistance of the auxiliary or pilot conductor 13. Additional resistors 22 and 23 are placed in series with and at opposite ends of the pilot wires 12 and 11, respectively. The resistance value of these resistors is so related to those of the resistors 19, 20 that the desired result will be obtained with the connections shown. These connections comprise a conductive coupling between the points F and H and E and G, respectively, and inductive couplings, here shown as consisting of transformers 24 and 25 respectively. The primary winding of the transformer 24 is connected across the resistor 22 and the secondary is connected in series between the points E and G. The windings of the transformer 25 are similarly connected at the other end. By providing resistors 22 and 23 of suitable resistance, the voltage gradients shown in Fig. 4 will be obtained. In this figure, A' B' represents the rise of voltage in the secondary winding of the current transformer 9, B' E' the voltage gradient along the resistor 22 to the point E, E' C' the voltage gradient along the remainder of the pilot wire 12 to the point C, that is, the drop of the represented resistor 20, and B' G' the gradient between the points B and G. In like manner the voltage gradients shown on the right hand side of Fig. 4 represent the voltage drops per unit lengths for the other portions of the pilot circuit. It will be seen that the points G' and H' are at potentials which are equal to one half the rise in the secondary windings of the current transformers 9 and 10, respectively, when the protected circuit 8 is healthy. Consequently, no charging currents will flow between the pilot wires 11, 12 and the auxiliary wire 13. The voltage gradients, when a fault occurs on the protected circuit 8, are represented in Fig. 5, where the secondary winding of the current transformer 9 is shown as having a voltage A' B' applied to it, while the secondary winding of the current transformer 10 is shown, by the voltage gradient C' D' as consuming voltage. The voltage gradient of the auxiliary line 13 is now represented by G' H', or, in other words, there is a difference of potential between the ends of the auxiliary wire 13, and the protective relays 14 and 15 will, therefore, operate.

In Fig. 6 the circuit to be protected comprises a circuit breaker 26 and three conductors 27, 28, 29 in series with which are connected the primary windings of two groups of current transformers 30, 31 and 32, and 33, 34 and 35, respectively. The first group 30 to 32 is provided for dealing with earth faults, and the second group 33 to 35 for dealing with interphase faults. The secondary windings of the first group are connected end-to-end as shown through the primary winding 36 of a transformer 37 and the secondary windings of the second group are connected as shown through a second primary winding comprising the two portions 38 and 39 of the same transformer. The secondary winding 40 of the transformer 37 energizes the pilot wires 11 and 12. The arrangement here shown further provides means for biasing, in order to prevent the operation of a protective relay, due to small discrepancies in the characteristics of the protective devices, which might occur if heavy through faults were fed by the protected circuit or portion thereof while the same itself were healthy. This bias may conveniently be provided by means of biasing transformers, such as are disclosed in United States Letters Patents Nos. 1,468,441 and 1,560,934 to A. S. Fitzgerald dated respectively September 18, 1923 and November 10, 1925. These biasing transformers comprise a primary winding, a biasing or restraining winding, and a secondary winding which are here designated, respectively, 41, 42 and 43, or 41', 42' and 43'. The primary winding is connected to receive operating current, the winding 41 being connected in series with the pilot conductor 13 and the winding 41' in circuit with the secondary winding 43. The secondary windings 43 and 43' are inductively related to the primary windings 41 and 41', respectively. The restraining winding 42, 42' is so disposed, however, as to produce substantially no electromotive force as the terminals of the primary and secondary windings but is adapted to receive current which regulates the flux set up by the primary winding caused by any given operating current. The restraining winding 42 is tapped at its mid-point and a connection taken therefrom to the secondary winding of the current transformer 34. The secondary winding 43 is connected in series to primary winding 41' and the secondary winding 43' is connected to the protective relay 14. The restraining winding 42' is connected to the ends of the secondaries of the earth-fault responsive group of transformers 30 to 32 and therefore exerts a restraining effect dependent on the residual current of the circuit 27, 28, 29. It is of course to be understood that similar apparatus will be installed at the other end of the circuit, the pilot conductors 11 and 12 being connected for circulating current as before.

Assuming an interphase fault as between conductors 27 and 29 for example, fault currents will appear as indicated by the solid line arrows, those appearing in the secondaries 30 and 31 will not of course be reflected in the pilot circuit. Current, however, will be induced in the secondary 40 of the transformer 37 as indicated by the solid arrow. If the fault is a through fault, a substantially equal current will appear in the secondary of the corresponding transformer 37 at the other end of the circuit, and the points at which the pilot conductor 13 is connected will be at substantially the same potential. If, however, the fault occurs between the ends of the protected portion of the circuit, the currents appearing in the secondaries 40 of the transformers 37 at the ends of the circuit will differ in amount and/or direction and current will appear in the pilot conductor 16 and thereby effect the operation of the protective relay 14.

Assuming a fault to ground as on conductor 28, fault currents will appear as indicated by the broken line arrows. Currents are again induced in the secondaries 40 of the transformers 37 at the ends of the circuit, and if the fault is not a through fault, those currents will differ in direction and/or amount so that the points at which the conductor 13 is connected will no longer be at equal potentials and consequently the protective relay 14 will be actuated.

Fig. 7 shows a simplified modification of Fig. 6 for protecting a three phase circuit. The apparatus at each end of the circuit may be identical. Instead of using the biasing means described above, in connection with Fig. 6, the protective relays 14' and 15' are indicated diagrammatically as of a suitable vibrating type, for example, such as is disclosed in British Patent No. 257,337 issued to The British Thomson-Houston Company Limited. In Fig. 7 choke coils 44 and 45 may be inserted as indicated. In other respects Figs. 6 and 7 are the same, though it would be noted that in Fig. 7 there are only four wires, 46, 47, 48 and 49, between the two groups of current-transformers and the pilot circuit, as against five in Fig. 6. The resistors 22 and 23 are conveniently adjustable resistors.

While we have shown and described our invention in considerable detail we do not desire to be limited to the exact arrangements shown, but seek to cover in the appended claims all those modifications that fall within the true spirit and scope of our invention.

What we claim as new and desire to secure by Letters Patent of the United States, is:

1. In a protective arrangement for an electric circuit, a pilot circuit including pilot wires extending between two points of the electric circuit and arranged to be energized therefrom, an auxiliary circuit connected across normally equipotential points of said pilot circuit and including a pilot conductor, and means for normally maintaining the potential at the ends of the pilot conductor at a value substantially equal to one half of the potential drop in one of the pilot wires.

2. In a protective arrangement for an electric circuit, a pilot circuit including pilot wires extending between two points of the electric circuit and arranged to be energized therefrom, and an auxiliary circuit connected across normally equipotential points of said pilot circuit and including a pilot conductor and means for normally maintaining the potential at the ends of the pilot conductor at a value different from that of said equipotential points.

3. In a protective arrangement for an electric circuit, a pilot circuit including pilot wires extending between two points of the electric circuit and arranged to be energized therefrom and an auxiliary circuit connected across normally equipotential points of said pilot circuit and including a pilot conductor, and inductive means having windings in series relation with said pilot wires and pilot conductor for normally maintaining the potential at the ends of the pilot conductor at a value different from that of said equipotential points.

4. In a protective arrangement for an electric circuit, a pilot circuit including two pilot wires extending between two points of the electric circuit and arranged to be energized therefrom, an auxiliary circuit connected across normally equipotential points of said pilot circuit and including a pilot conductor, and means for normally maintaining the potential at the ends of the pilot conductor at a value different from that of said equipotential points comprising transformers respectively connected in series relation with said pilot wires.

5. In a protective arrangement for an electric circuit, a pilot circuit including two pilot wires extending between two points of the electric circuit and arranged to be energized therefrom, an auxiliary circuit connected across normally equipotential points of said pilot circuit and including a pilot conductor and means for normally maintaining the potential at the ends of the pilot conductor at a value substantially equal to one half of the potential drop in one of the pilot wires comprising a transformer having a primary winding in series relation with one of said pilot wires adjacent one of said equipotential points and a secondary winding in circuit with said pilot conductor and a transformer having a primary winding in series relation with the other pilot wire adjacent the other equipotential point and a secondary winding in circuit with the pilot conductor.

In witness whereof, we have hereunto set our hands this thirteenth day of September 1927.

SYDNEY MAURICE LEJEUNE.
HERBERT STANLEY PETCH.